United States Patent
Morello et al.

(10) Patent No.: US 11,691,455 B2
(45) Date of Patent: Jul. 4, 2023

(54) FLANGED WHEEL HUB BEARING PROVIDED WITH A SENSOR

(71) Applicant: Aktiebolaget SKF, Gothenburg (SE)

(72) Inventors: Fausto Morello, Sommariva del Bosco (IT); Deepak G, Bangalore (IN); Pradeep HJ, Bangalore (IN)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/711,132

(22) Filed: Apr. 1, 2022

(65) Prior Publication Data
US 2022/0227169 A1 Jul. 21, 2022

Related U.S. Application Data

(63) Continuation of application No. 16/508,733, filed on Jul. 11, 2019, now Pat. No. 11,318,784.

(30) Foreign Application Priority Data

Aug. 2, 2018 (IN) .............................. 201841029105

(51) Int. Cl.
| | |
|---|---|
| *F16C 41/00* | (2006.01) |
| *F16C 33/72* | (2006.01) |
| *B60B 27/00* | (2006.01) |
| *G01P 1/02* | (2006.01) |
| *G01P 3/44* | (2006.01) |

(52) U.S. Cl.
CPC ...... *B60B 27/0078* (2013.01); *B60B 27/0068* (2013.01); *F16C 33/72* (2013.01); *F16C 41/007* (2013.01); *G01P 1/026* (2013.01); *G01P 3/443* (2013.01); *F16C 2326/02* (2013.01)

(58) Field of Classification Search
CPC .... F16C 33/72; F16C 41/007; F16C 2326/02; B60B 27/0068; B60B 27/0078; G01P 1/026; G01P 3/443
See application file for complete search history.

(56) References Cited

U.S. PATENT DOCUMENTS

| | | | |
|---|---|---|---|
| 4,783,180 A * | 11/1988 | Hayashi | .............. B60B 27/0068 384/480 |
| 4,795,278 A | 1/1989 | Hayashi | |
| 5,080,500 A * | 1/1992 | Hilby | ...................... G01P 3/443 310/168 |
| 5,127,747 A | 7/1992 | Hilby et al. | |
| 5,640,087 A | 6/1997 | Alff | |
| 8,007,179 B2 | 8/2011 | Heim et al. | |

(Continued)

FOREIGN PATENT DOCUMENTS

IT     T020111708     2/2013

*Primary Examiner* — Alan B Waits
(74) *Attorney, Agent, or Firm* — Reed Smith LLP

(57) ABSTRACT

A wheel hub bearing for motor vehicles including a rotatable hub provided with a flange for the engagement of the hub to a wheel of a vehicle and provided with a radially outer free portion and a bearing unit provided with a radially outer ring for the engagement of the wheel hub bearing to a knuckle of the vehicle and a radially inner rotatable ring angularly connected to the hub. Furthermore, the wheel hub bearing has a device for detecting a vehicle parameter and provided with an encoder and a sensor in communication with the encoder. The encoder is ridgidly coupled to the radially outer free portion of the flange to jointly rotate with the hub.

11 Claims, 2 Drawing Sheets

(56) References Cited

U.S. PATENT DOCUMENTS

| | | |
|---|---|---|
| 2004/0074317 A1 | 4/2004 | Colombo et al. |
| 2006/0186627 A1 | 8/2006 | Koyagi et al. |
| 2008/0044118 A1 | 2/2008 | Haepp et al. |
| 2013/0249273 A1* | 9/2013 | Norimatsu ............ F16C 41/007 301/109 |
| 2016/0312835 A1 | 10/2016 | Nicolas et al. |
| 2017/0336278 A1 | 11/2017 | Mol |
| 2018/0126781 A1* | 5/2018 | Duch .................... F16C 33/586 |

* cited by examiner

FLANGED WHEEL HUB BEARING PROVIDED WITH A SENSOR

CROSS-REFERENCE TO RELATED APPLICATIONS

This application is a continuation application of Ser. No. 16/508,733 filed on Jul. 11, 2019 which claims priority to Indian patent application no. IN201841029105 filed on Aug. 2, 2018, the contents of which are fully incorporated herein by reference.

FIELD

The present invention is related to a wheel hub bearing provided with a device for detecting a motor vehicle parameter by means of a sensor. For example, the parameter can be the rotational speed of a motor vehicle wheel and the sensor can be a speed sensor controlled by the known system "Antilock Brake System" (ABS).

The present invention is particularly suitable, even if not exclusively, for wheel hub bearing of motor vehicles, provided with a rolling bearing. Such applications include both the case where the outer ring of the bearing is rotating while the inner ring of the bearing is fixed, and the opposite case in which the inner ring rotates and the outer ring is fixed. The invention is also suitable for any type of rolling element (balls, rollers, tapered rollers, etc.).

BACKGROUND

Devices for detecting the rotational speed of the bearing rotating ring, or other parameter of the motor vehicle, are known and commonly used. Such devices comprise a phonic wheel or encoder and a sensor, normally a speed sensor, adapted to acquire a signal generated by the phonic wheel. The device is controlled by the braking control system (ABS) and also allows monitoring the kinematic operating parameters of the wheel hub assembly with a rolling bearing.

The phonic wheel or encoder is in the form of an annular disc or a cylindrical screen made of plastic or magnetized rubber. It is angularly integral with the rotating ring of the bearing at its axially internal end. In known solutions, the encoder comprises a metal insert, integral with the plastic or magnetized rubber portion, for example by gluing, and integral for forced coupling to the rotating ring of the bearing or to an element integral with it, for example a cassette sealing element.

The known phonic wheel solutions are then realized using magnetized rubber or plasto-ferrite, respectively co-vulcanized or co-molded on a metal insert having a thickness of 0.6-0.8 mm, having a structural function.

The measurement of the rotational speed of the wheels or of the bearing associated with the wheel is essential for the ABS functionality. As mentioned, the sensors normally used are based on magnetic effects, they are positioned outside the bearings, most of the times inside a hole made in the suspension, and are facing the bearing. The encoder that generates the magnetic signal is placed on the bearing and is mechanically connected to the rotating ring. The distance between the encoder and the sensor is essential to ensure that the signal is read even in the worst conditions. This is a major constraint in the design of the wheel hub bearing and requires tighter tolerances for suspension.

Furthermore, current technology is also limited by the density of the inverse polarity poles pairs that can be accommodated on the encoders. This density of poles pairs therefore constitutes a limit to the reading resolution of the sensor. This limit becomes more and more burdensome, since the adoption and diffusion of devices for the autonomous driving of the vehicle, for example parking assistance devices, is generating a request for greater resolution to better control the position of the vehicle.

There is therefore a need to design a device for detecting the rotational speed which is free from the aforementioned drawbacks and which in particular allows to obtain an optimal resolution of the reading adapted to the requirements of motor vehicle manufacturers.

SUMMARY

Aim of the present invention is to realize a wheel hub bearing provided with a device for detecting a motor vehicle parameter, for example the rotational speed of its wheel, which avoids the above described drawbacks.

The solution chosen to improve the sensor signal, for example the speed sensor, is to increase the nominal reading diameter of the sensor so as to accommodate a greater number of poles pairs in the encoder. This solution is obtained by housing the encoder at the outer periphery of the flange of the wheel hub assembly and making it integral with the flange, as will be better explained in the detailed description, instead of using the known assembly on the radially inner ring. In this way a nominal reading diameter is obtained, whose value is almost double with respect to the value obtained according to the prior art. Consequently, also the number of poles pairs with inverse polarity accommodated on the encoder will be greater than the number obtainable from the known embodiments.

Advantageously, the speed sensor facing the encoder will be mounted on the suspension knuckle by interposing an intermediate element whose position is adjustable and consequently allows the adjustment of the air gap between the sensor and the encoder.

The purpose is to obtain a signal from the sensor provided with a higher resolution and therefore to improve the accuracy of the positioning of the vehicle, especially in situations in which the control unit manages the assisted parking maneuvers.

Therefore, the use of such a device allows to considerably improve the resolution of the rotational speed measurement in comparison with that provided by the magnetic effect sensors mounted according to the prior art on the inner ring of the bearing. This improvement is due both to the effect of the greater number of poles pairs with inverse polarity and for the possibility of adjusting the amount of the air gap between the sensor and the encoder according to the needs.

Therefore, according to the present invention, a wheel hub bearing is described, the wheel hub bearing having a device for detecting a motor vehicle parameter, for example the rotational speed of its wheel, according to the characteristics as in the enclosed independent claim.

Further embodiments of the invention, preferred and/or particularly advantageous, are described according to the characteristics as in the enclosed dependent claims.

BRIEF DESCRIPTION OF THE SEVERAL VIEWS OF THE DRAWING

The invention will now be described with reference to the accompanying drawings, which illustrate some examples of non-limiting implementation, in which.

DETAILED DESCRIPTION

Figure 1:
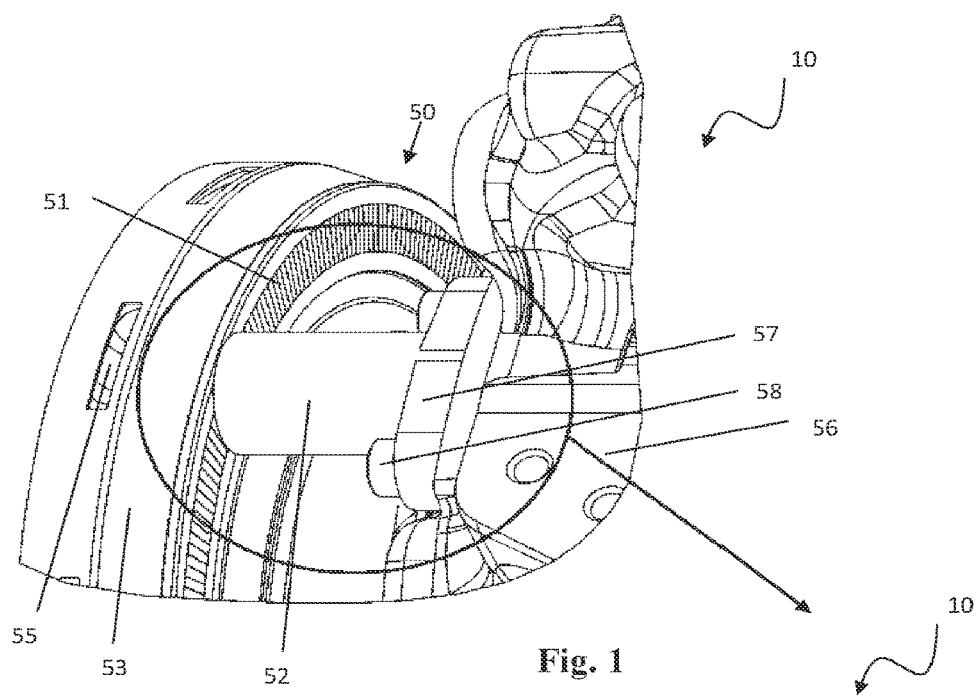
FIG. 1, in a partial axonometric view, shows a wheel hub bearing provided with a device for detecting the rotational speed, according to an embodiment of the invention, FIG. 2, in a partial axi-symmetrical section, shows the wheel hub bearing provided with the device for detecting the rotational speed of FIG. 1, and FIG. 3, in a partial axi-symmetrical section, shows the wheel hub bearing provided with the device for detecting the rotational speed of FIG. 1, according to an alternative embodiment.
Figure 2:
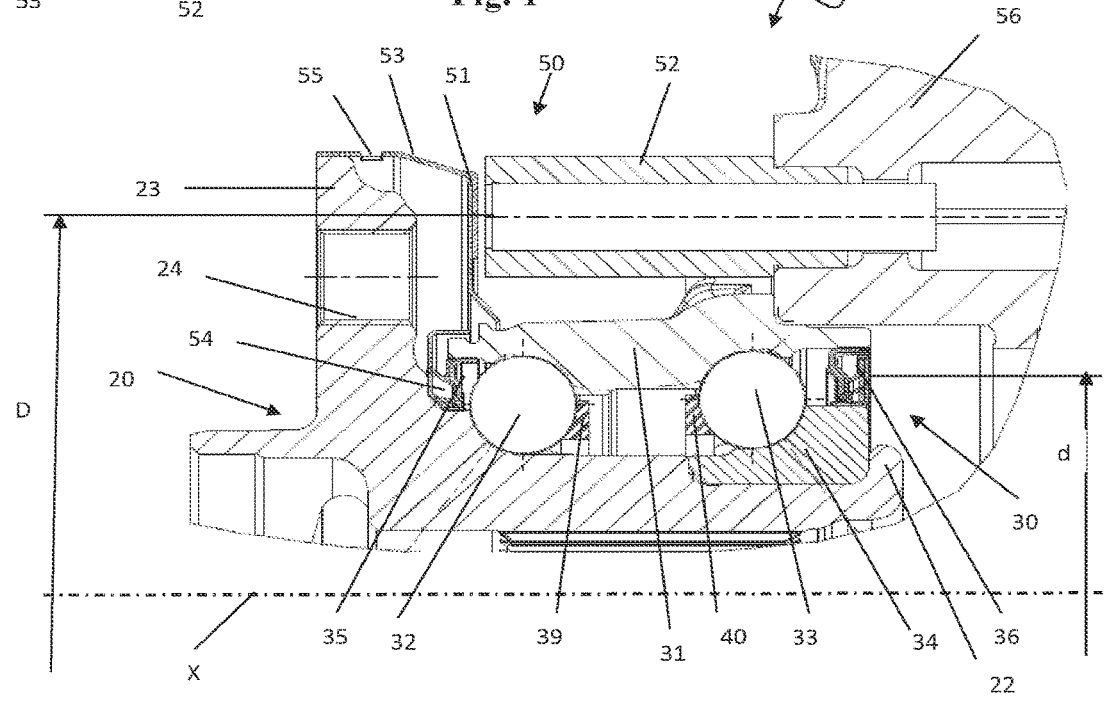

With reference to the aforementioned figures, 10 indicates as a whole a wheel hub bearing according to a preferred embodiment of the invention. As stated in the introduction, the invention is applicable not only to the configuration described below but more generally to any wheel hub bearing for motor vehicles.

The assembly 10 comprises a hub 20 preferably, but not necessarily, rotatable and a bearing unit 30. The hub 20 is configured to also assume the function of a radially inner ring of the bearing.

In all the present description and enclosed claims, terms and wording, indicating positions and directions, as "radial" or "axial" have to be understood as referred to the rotation axis X. Wording as "axially inner" or "axially outer" have to be referred to a mounting condition of the hub-bearing unit on the motor vehicle.

The bearing unit 30 comprises a radially outer ring 31, stationary, provided with respective radially outer raceways, at least one radially inner ring 20, 34, provided with respective radially inner raceways and two rolling elements crowns 32, 33, in this example balls. The axially outer rolling elements crown 32 is interposed between the radially outer ring 31 and the hub 20, having a radially inner ring function, while the axially inner rolling elements crown 33 is interposed between the radially outer ring 31 and radially inner ring 34. For simplicity of graphic representation, references 32, 33 will be attributed both for the individual balls and the balls rows and in particular with 32 will be referenced the axially outer balls row or single ball, while with 33 will be referenced the axially inner balls row or single ball. Again, for simplicity, the term "ball" can be used in the present description instead of the more generic "rolling element" term (and the same numeral reference will also be used in the attached drawings). It is always understood that instead of the balls any other rolling element can be used (for example, rollers, conical rollers, small rollers, etc.).

The bearing unit 30 is sealed by suitable sealing elements 35, 36 which are cassette sealing elements, as in the prior art. The rolling elements of the crowns 32, 33 are held in position by corresponding cages 39, 40.

The hub 20 defines in its axially inner end a rolled edge 22 which is configured for axially preloading the inner ring 34. The hub 20 also has an axially outer flange 23. The flange 23 has a plurality of axial fixing holes 24. These holes are the seats for the same number of fixing means (for example stud bolts, not shown in the figure) which connect in a known manner an element of the motor vehicle wheel, for example the brake disc (also of known type and not shown in the figure), at the hub 20. The flange 23 is also provided with a radially outer free portion 23'.

The bearing is equipped with a device 50 for detecting a parameter of the motor vehicle, for example the rotational speed of the rotatable ring of the bearing unit 30, and is provided with an encoder 51 and a sensor, for example a speed sensor 52 with magnetic effect.

The solution according to the present invention aims to improve the resolution and accuracy of the speed sensor signal. In other words, what we want to achieve is the possibility of housing a greater number of poles pairs on the encoder, increasing the nominal reading diameter of the sensor.

Therefore, according to the present invention, the encoder 51 is mounted at the radially outer free portion 23' of the flange 23 of the wheel hub assembly 10, steadily engaged with the flange 23. More specifically, the encoder is mounted on the radially outer side surface 53' of a protective cover 53, which is steadily engaged with the radially outer free portion 23' of the flange 23.

The cover 53, object of a previous patent application by the writer, ITTO2011A000708, is mounted on the flange 23 so as to rotate together with the hub 20 and extends around the lateral surface of the radially outer ring to circumscribe the gap 54 from the outside of the bearing unit 30. The cover is also provided with a plurality of discharge windows 55 passing through for the evacuation of any moisture that has accidentally entered or formed inside the cover 53.

In this way, by mounting the encoder 51 on the side surface 53' of the cover 53 instead of on the axially inner ring 34 or on an element connected thereto, as per the prior art, a nominal reading diameter D of the sensor is obtained, value almost double with respect to the nominal reading diameter d obtainable from solutions according to the prior art. As a consequence, also the number of poles pairs with inverse polarity lodged on the encoder will be greater and almost double compared to that of the known embodiments.

To give an exemplifying and non-limiting idea, according to the known art, the reading diameter d is of the order of 80 mm and such an encoder allows the housing of 48 poles pairs. Vice versa, according to an embodiment of the present invention, the reading diameter D is about 130mm and the relative encoder 51 allows to house about 126 poles pairs.

Preferably, in order to meet the needs of "premium" range cars, where autonomous driving or at least assistance during parking maneuvers are rapidly spreading, experimental evidence has shown that, in order to obtain high resolution of the signal and greater accuracy in reading, an optimal range for the value of the nominal reading diameter D is between 130 mm and 150 mm, allowing the lodging of a number of poles pairs between 120 and 160.

Advantageously, the speed sensor 52 facing the encoder 51 is assembled on the knuckle 56 of the suspension by interposing an intermediate element 57. The axial position of the sensor is adjustable by means of clamping or tightening elements 58, in particular bolts. The intermediate element 57 may be a block which is separate or integrated with the knuckle of the suspension. In this way, the axial dimension of the air gap between the sensor 52 and the encoder 51 can be adjusted according to the signal reading requirements.

An undoubted technical advantage of this solution is that it is no longer necessary to house the encoder on the radially inner ring 34. This advantage further simplifies the design of the bearing unit.

Figure 3:
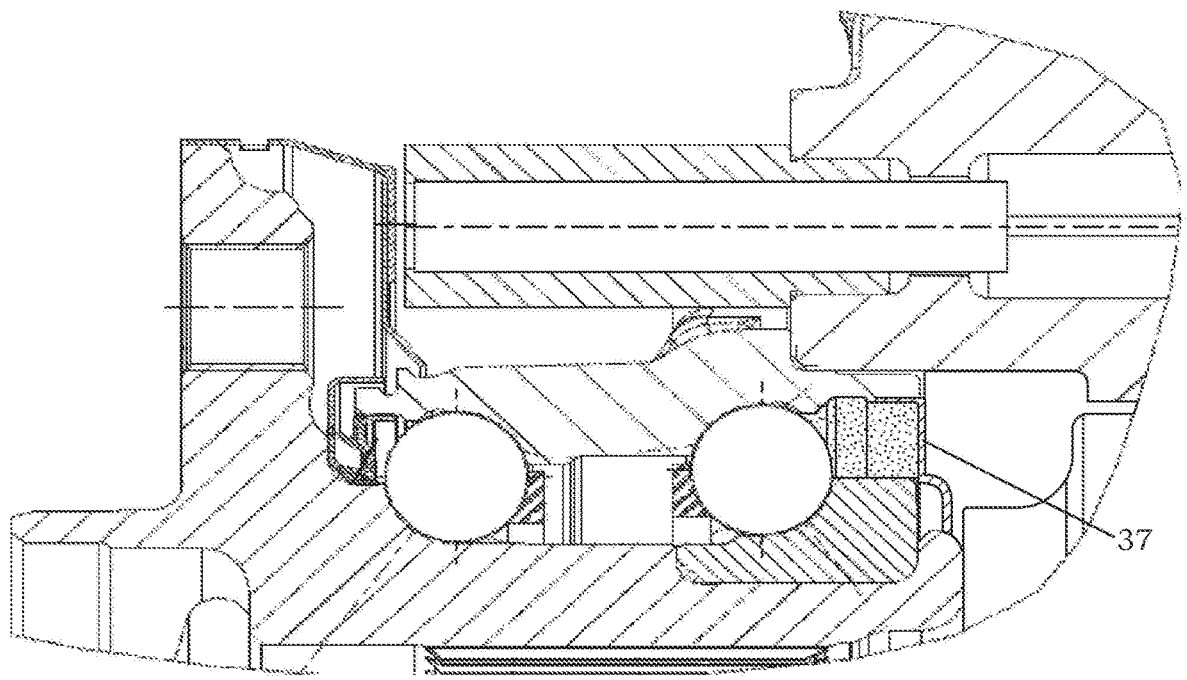

In fact, as can be seen in FIG. 3, since there is no longer an encoder, the axially inner cassette seal 36 is not even necessary since it is sufficient to provide a protective screen with an elastomeric lip to isolate the inside of the bearing unit.

Therefore, with the present invention numerous and significant advantages are achievable. First of all, the speed sensor will have greater accuracy and resolution with this ensuring to identify a more precise position of the vehicle as well as its speed.

Furthermore, the use of such a solution requires the adoption of the protective cap which guarantees an excellent protection of the entire axially external area of the bearing and in particular of its cassette seal.

Finally, the design of the bearing unit can be simplified and consequently be less expensive due to the fact that the concept of cassette seal can be eliminated by introducing a simpler protective screen.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A wheel hub bearing for motor vehicles, the wheel hub bearing comprising:
    a rotatable hub provided with a flange for the engagement of the hub to a wheel of a vehicle, a radially outer free portion, and a bearing unit having a radially outer ring for the engagement of the wheel hub bearing to a knuckle of the vehicle and a radially inner rotatable ring angularly fixed to the hub,
    a device for detecting a vehicle parameter being provided, the device including an encoder and a sensor with magnetic effect, the encoder is configured to generate magnetic signal, the sensor being in communication with and axially spaced from the encoder and facing the encoder, and
    a protective cap coupled to a radially outer free portion of the flange, wherein the protective cap comprises a radially extending sidewall having an axially inner side surface and an axially outer side surface, wherein the axially outer side surface is axially spaced from and faces an axially inner side surface of the flange, and
    wherein the encoder is mounted on a radially outer end of the axially inner side surface of the radially extending sidewall at the radially outer free portion of the flange wherein the encoder is engaged with the flange directly through the protective cap, so that the protective cap and encoder rotate with the same rotational speed of the hub, wherein the encoder is solely coupled to the rotatable hub though the protective cap's coupling to the radially outer free portion of the flange.

2. The wheel hub bearing of claim 1, wherein the device for detecting a vehicle parameter detects a rotational speed with a speed sensor, wherein the value of a nominal reading diameter (D) of the speed sensor ranges between 130 mm to 150 mm.

3. The wheel hub bearing of claim 2, wherein the intermediate element is a block, separated or integrated to the knuckle of the suspension.

4. The wheel hub bearing of claim 3, further comprising a plurality of discharge windows in the cylindrical sidewall.

5. The wheel hub bearing according to claim 1, wherein a number of poles pairs with inverse polarity accommodated on the encoder ranges between 120 to 160.

6. The wheel hub bearing of claim 1, wherein the sensor is configured to be mounted on the knuckle of a vehicle suspension by interposing an intermediate element and the axial position of the sensor is adjustable by means of tightening elements configured to adjust the axial position between the sensor and the encoder.

7. The wheel hub bearing of claim 1, further comprising a protective screen configured to isolate an interior of the bearing, wherein the protective screen has an elastomeric lip.

8. The wheel hub bearing of claim 1, wherein the protective cover further comprises a cylindrical sidewall coupled to a radially outer free portion of the flange, wherein the radially extending sidewall extends radially inwardly from the cylindrical sidewall.

9. A wheel hub bearing for motor vehicles, the wheel hub bearing comprising:
    a rotatable hub provided with a flange for the engagement of the hub to a wheel of a vehicle, a radially outer free portion, and a bearing unit having a radially outer ring for the engagement of the wheel hub bearing to a knuckle of the vehicle and a radially inner rotatable ring angularly fixed to the hub, and
    a device for detecting a vehicle parameter being provided, the device including an encoder and a speed sensor with magnetic effect, the encoder is configured to generate magnetic signal, the sensor being in communication with and axially spaced from the encoder and facing the encoder, wherein the encoder is rigidly coupled to the radially outer free portion of the flange to jointly rotate with the hub, wherein the encoder is engaged with the flange through a protective cover;
    wherein the encoder is mounted on a radially outer end of an axially side surface of the protective cover rigidly coupled to the flange and extending around a lateral surface of the radially outer ring, so that the protective cover rotates with the same rotational speed of the hub, wherein the protective cover further comprises an axially outer side surface axially spaced from and facing an axially inner surface of the flange;
    wherein the speed sensor is configured to be mounted on the knuckle of a vehicle suspension by interposing an intermediate element and the axial position of the speed sensor is adjustable by means of tightening elements configured to adjust the axial position between the speed sensor and the encoder, wherein the encoder is solely coupled to the rotatable hub though the protective cap's coupling to the radially outer free portion of the flange.

10. The wheel hub bearing of claim 9, wherein the value of a nominal reading diameter (D) of the speed sensor ranges between 130 mm to 150 mm.

11. The wheel hub bearing according to claim 9, wherein a number of poles pairs with inverse polarity accommodated on the encoder ranges between 120 to 160.

* * * * *